US007797469B2

(12) United States Patent
O'Keefe et al.

(10) Patent No.: US 7,797,469 B2
(45) Date of Patent: Sep. 14, 2010

(54) PORTABLE RECEIVER AND MEMORY FOR REMOTELY CONTROLLED PRESENTATIONS

(75) Inventors: Mark D. O'Keefe, San Diego, CA (US); Ivan Reiff, San Diego, CA (US); Huong Tovan, Temecula, CA (US)

(73) Assignee: Honeywell International Inc., Morristown, NJ (US)

( * ) Notice: Subject to any disclaimer, the term of this patent is extended or adjusted under 35 U.S.C. 154(b) by 259 days.

(21) Appl. No.: 10/452,217

(22) Filed: May 30, 2003

(65) Prior Publication Data

US 2004/0243726 A1    Dec. 2, 2004

(51) Int. Cl.
*G06F 31/12* (2006.01)
*G06F 13/00* (2006.01)

(52) U.S. Cl. ............................. 710/62; 710/305; 710/72

(58) Field of Classification Search ............. 710/62–64, 710/72–74, 305–313; 725/60, 81, 76, 136, 725/73; 713/300
See application file for complete search history.

(56) References Cited

U.S. PATENT DOCUMENTS

| 5,675,813 | A | * | 10/1997 | Holmdahl | 713/310 |
|---|---|---|---|---|---|
| 6,282,714 | B1 | * | 8/2001 | Ghori et al. | 725/81 |
| 6,577,337 | B1 | * | 6/2003 | Kang | 348/207.1 |
| 6,650,549 | B1 | * | 11/2003 | Chiao | 361/785 |
| 6,715,881 | B2 | * | 4/2004 | Fujiwara | 353/21 |
| 6,725,302 | B1 | * | 4/2004 | Benayoun et al. | 710/62 |
| 6,804,727 | B1 | * | 10/2004 | Rademacher | 710/9 |
| 6,819,677 | B1 | * | 11/2004 | Nouzovsky et al. | 370/466 |
| 7,061,477 | B1 | * | 6/2006 | Noguchi | 345/204 |
| 7,076,204 | B2 | * | 7/2006 | Richenstein et al. | 455/3.06 |
| 2001/0014102 | A1 | * | 8/2001 | Mattingly et al. | 370/421 |
| 2002/0099884 | A1 | * | 7/2002 | Chang et al. | 710/62 |
| 2003/0028688 | A1 | * | 2/2003 | Tiphane et al. | 710/1 |
| 2003/0035471 | A1 | * | 2/2003 | Pitsoulakis | 375/222 |
| 2003/0099301 | A1 | * | 5/2003 | Green | 375/259 |
| 2003/0125070 | A1 | * | 7/2003 | Wagner et al. | 455/550 |
| 2003/0217205 | A1 | * | 11/2003 | Chen et al. | 710/62 |

(Continued)

FOREIGN PATENT DOCUMENTS

CN        2603435 Y        2/2004

OTHER PUBLICATIONS

Introducing Remote Point Presenter, www.interlinkelectronics.com, printed on Jun. 9, 2003.

(Continued)

*Primary Examiner*—Christopher B Shin
(74) *Attorney, Agent, or Firm*—Husch Blackwell Sanders Welsh & Katz

(57) ABSTRACT

A computer peripheral connects to a host computer such as a PC to assist in a presentation. The peripheral includes a memory and receiver combined within a portable, light-weight housing. Presentation data is stored in the memory, while the receiver receives wireless signals from a handheld transmitter for paging through slides or other segments of the presentation using page up and page down instructions. The memory may be a USB hard drive, for example, or other portable storage media. The peripheral is connected to the host computer using a USB cable and an externally-accessible port in the housing, for example. A hub controller within the peripheral enables the memory and receiver to communicate with the externally-accessible port, thereby providing communication with the host computer.

14 Claims, 6 Drawing Sheets

U.S. PATENT DOCUMENTS

| | | | |
|---|---|---|---|
| 2003/0233519 A1* | 12/2003 | Chien et al. | 711/115 |
| 2004/0006648 A9* | 1/2004 | Kita et al. | 709/250 |
| 2004/0010805 A1* | 1/2004 | Dvir et al. | 725/136 |
| 2004/0013434 A1* | 1/2004 | Hua | 398/106 |
| 2004/0055010 A1* | 3/2004 | Fries et al. | 725/60 |
| 2004/0198429 A1* | 10/2004 | Yen et al. | 455/556.1 |
| 2004/0208182 A1* | 10/2004 | Boles et al. | 370/395.5 |
| 2004/0230790 A1* | 11/2004 | Zhang et al. | 713/2 |
| 2005/0039208 A1* | 2/2005 | Veeck et al. | 725/76 |

OTHER PUBLICATIONS

Power Presenter RF instruction manual, Street Smart Technologies, Poway, Calif. (undated).

Product Review: The Power Presenter Plus, www.barrel-of-monkeys.com, printed on May 1, 2003.

Product advertisement for USB external hard drives, www.usbgear.com, printed May 1, 2003.

Sony new 256 Megabyte Micro Vault USB storage media device USB 2.0, www.pc4d.com, printed on May 6, 2003.

AU9254 R2 USB Hub Controller Technical Reference Manual, Rev. 1.0, Alcor Micro Corp., 2002.

IS24C01-2 EEPROM data sheet, Integrated Silicon Solutions, Inc. Sep. 2001.

HCS500 KeeLoq (R) Code Hopping Decoder data sheet, Microchip Technology, Inc. 2002.

DA227 Switching diode data sheet, Rohm Electronics (undated).

CY7C63722 encore USB Combination Low-Speed USB & PS/2 Peripheral Controller technical manual, p. 1-8 excerpted, Cypress Semiconductor Corp., Oct. 1, 2002.

* cited by examiner

PORTABLE RECEIVER AND MEMORY FOR REMOTELY CONTROLLED PRESENTATIONS

BACKGROUND OF THE INVENTION

1. Field of Invention

The invention relates generally to a computer peripheral and, more particularly, to a combined receiver and memory in a computer peripheral.

2. Description of Related Art

Presentation applications such as Microsoft PowerPoint® enable businesspersons, students and others to create and present professional looking presentations. The presentations typically comprise a series of static slides or multimedia images that the presenter displays in sequence on a host computer by pressing a "page down" key on a keyboard, or by clicking on a "next page" icon or the like in an on-screen interface using a mouse or other pointing device, when it is desired to view the next slide or segment. Applications such as Adobe Acrobat® also display successive pages using similar commands. Presentation software is available from many other suppliers as well, including Corel® and Apple®. Such presentations are typically created using software installed on a host computer, and the resulting data is stored on the hard drive for subsequent use. For presenters who travel, a portable laptop computer may be used to enable the presentation to be made at another location.

While a presentation may be viewed on the monitor of the host computer with small audiences, it is often desirable with larger audiences to connect a projector as a peripheral to the host computer to display the presentation images on one or more screens, typically in the same room as the host computer. It is also possible using networking techniques to display the presentation on remote computer monitors and screens. Recently, receiver peripherals have been developed that enable the presenter to page through the slides using a handheld wireless radio frequency (RF) transmitter. Such transmitters are convenient because they allow the presenter to stand at a lectern or other location near the screen to point out specific features of the slides without having to return to the keyboard of the host computer to display the next slide.

For presenters that travel, in particular, it is often not convenient to carry a laptop computer, and further difficulties often arise in setting up the computer with the projector equipment at the remote presentation location. While memory peripherals have been developed that enable storage and transport of data, this approach requires that an additional peripheral and cabling be carried while traveling. Moreover, an additional unused peripheral port on the host computer is needed.

BRIEF SUMMARY OF THE INVENTION

To overcome these and other deficiencies in the prior art, the present invention describes a portable computer peripheral with a combined wireless receiver and memory.

In one aspect of the invention, a computer peripheral includes a housing having an externally-accessible port for communicating with a host computer, a receiver within the housing for receiving a wireless signal from a transmitter and converting the wireless signal into an instruction for the host computer, and a memory within the housing for storing data for use by the host computer. A micro controller such as a hub controller is also provided within the housing for connecting the receiver and the memory to the externally-accessible port.

In another aspect of the invention, a computer peripheral includes a housing having an externally-accessible port for communicating with a host computer. A receiver within the housing receives a wireless signal from a transmitter and converts the wireless signal into an instruction for the host computer for controlling presentation software running at the host computer. A memory within the housing stores data for use by the presentation software running at the host computer. A micro controller within the housing connects the receiver to the externally-accessible port to provide the instruction to the host computer, and connects the memory to the externally-accessible port to provide the data to the host computer.

BRIEF DESCRIPTION OF THE DRAWINGS

These and other features, benefits and advantages of the present invention will become apparent by reference to the following text and figures, with like reference numbers referring to like structures across the views, wherein.

DETAILED DESCRIPTION OF THE INVENTION

The invention provides a computer peripheral that is particularly useful for presentations. The peripheral includes a receiver for receiving wireless signals from a handheld transmitter activated by the presenter, such as page up and page down instructions, along with a memory for storing data for a presentation. The peripheral can be provided in a small, easily transportable housing to provide all that is necessary for delivering a presentation. The user need only download the presentation data to the peripheral at a first location, then transport it to the presentation site, where the peripheral is plugged into an available host computer via a single port. The host computer uploads the presentation data to run the presentation. The receiver sends page up and page down instructions to the host computer via the receiver to control the presentation software running on the host computer in response to the transmitted signals.

Figure 1:
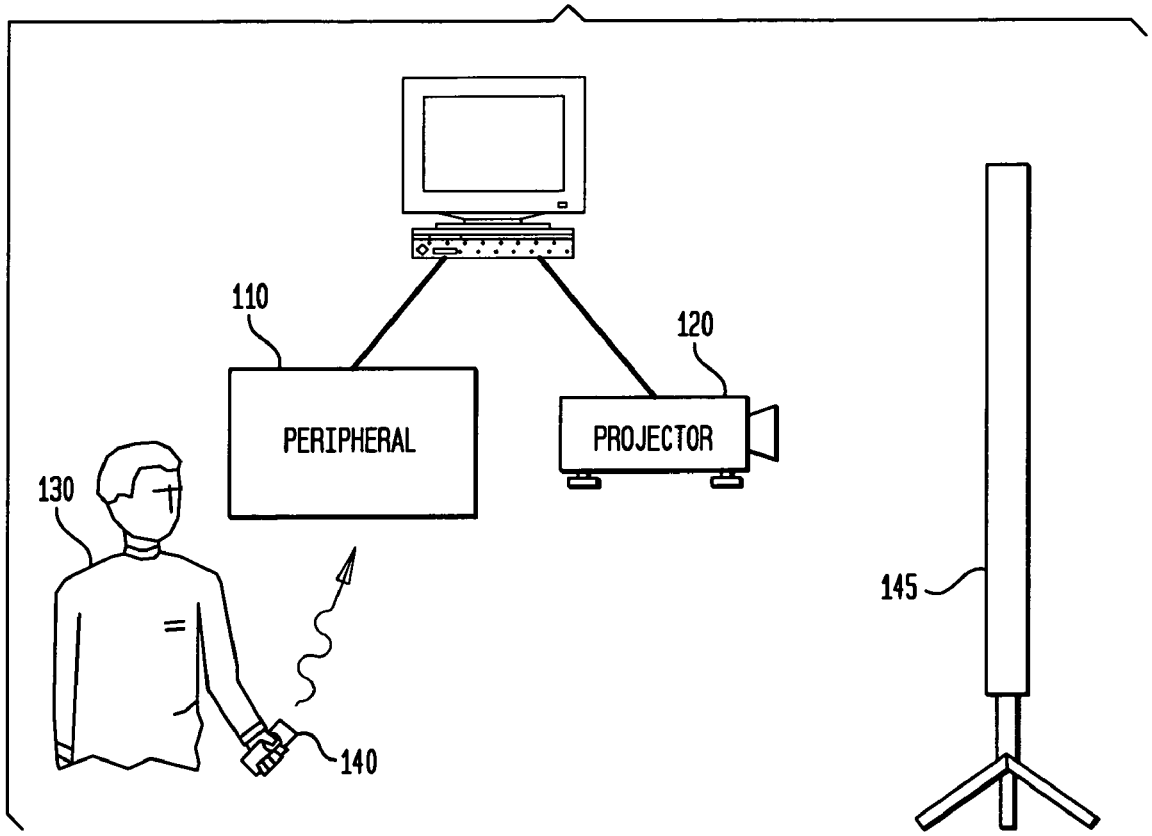
FIG. 1 illustrates an overview of a remotely-controlled presentation set-up according to the invention.

FIG. 1 illustrates an overview of a remotely-controlled presentation set-up according to the invention. A host computer 100, such as a personal computer (PC), includes ports that may be used to communicate with a peripheral receiver/memory 110 and a projector 120. Typically, a 15-pin VGA terminal on the host computer 100 is used to communicate with the projector 120 via an appropriate cable. The projector 120 projects the presentation on a screen 145. For the peripheral receiver/memory 110 of the invention, any type of port may be used, such as a small computer serial interface (SCSI), an interface conforming to IEEE 1394, a parallel interface, an IBM PS/interface, an Enhanced Integrated Disk Electronics (EIDE) interface, an Ethernet interface and a Universal Serial Bus (USB) interface. In a preferred embodiment, USB is used. USB is a popular interconnecting standard for computer peripherals that supports "plug and play" and "hot plugging". It is an open standard that supports a data rate of 12 Mbps. The four-wire USB cable is relatively thin and carries power for low-power devices. When a USB peripheral device is plugged into a host computer, the host computer senses a voltage difference and queries the device for type, vendor, functionality and bandwidth required, and the device is assigned a unique address ID. An appropriate device drive is loaded by the operating system of the host computer, and the user may be prompted for a driver disk if necessary. When the device is unplugged from the host, the host computer detects the detachment, alerts the appropriate application, and unloads the drivers.

A user 130 operates a handheld transmitter 140 to send wireless signals to the peripheral 110. Preferably, RF signals are transmitted so that the transmitter 140 need not be aimed at the peripheral 110 for its signals to be received. The transmitter 140 may transmit at 433 MHz, for example. Alternatively, an infrared transmitter may be used, in which case the transmitter must be aimed at the peripheral 110. In a further option, a wired link to the peripheral 100 may be used if desired.

Figure 2:
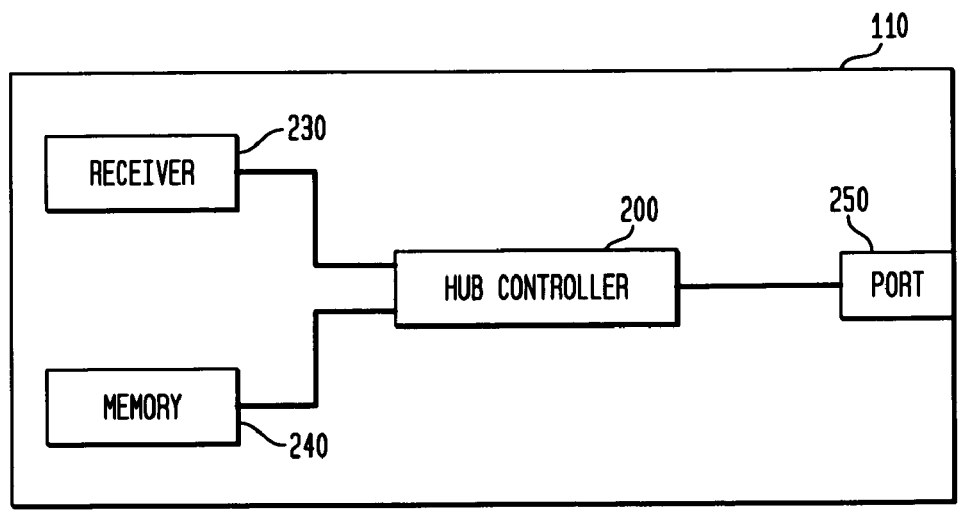
FIG. 2 illustrates a high-level diagram of a combined receiver and memory peripheral according to the invention.

FIG. 2 illustrates a high-level diagram of a combined receiver and memory peripheral according to the invention. The peripheral 110 is provided within a housing 700 (FIG. 7) that includes a hub controller 200 with pins that are assigned to at least two downstream ports and one upstream port 215. These pins are internal to the housing, and not accessible from outside the housing. Pins assigned to respective downstream ports are coupled to a receiver 230 and memory 240, while pins assigned to the upstream or root port is coupled to an externally-accessible port 250 of the housing. The externally-accessible port 250 includes at least a portion that is accessible from outside the housing. The port 250 is typically designed as a socket for receiving a cable end as a plug. The externally-accessible port 250 may be a USB port, for example, which is coupled to a corresponding port at the host computer 100 via a cable. Alternatively, more than one type of externally-accessible port may be provided. For example, both UBS and PS/2 ports may be used to provide compatibility with host computers that may have only one of these types of ports. It is convenient for the housing to be a plastic housing in which circuitry for providing the receiver 230 and memory 240 are provided. Such a housing can be easily transported and protects the internal circuitry against damage from dust and other elements. Circuitry for providing the functionality discussed herein may be provided using any known techniques. Example implementations are discussed below.

Figure 3:
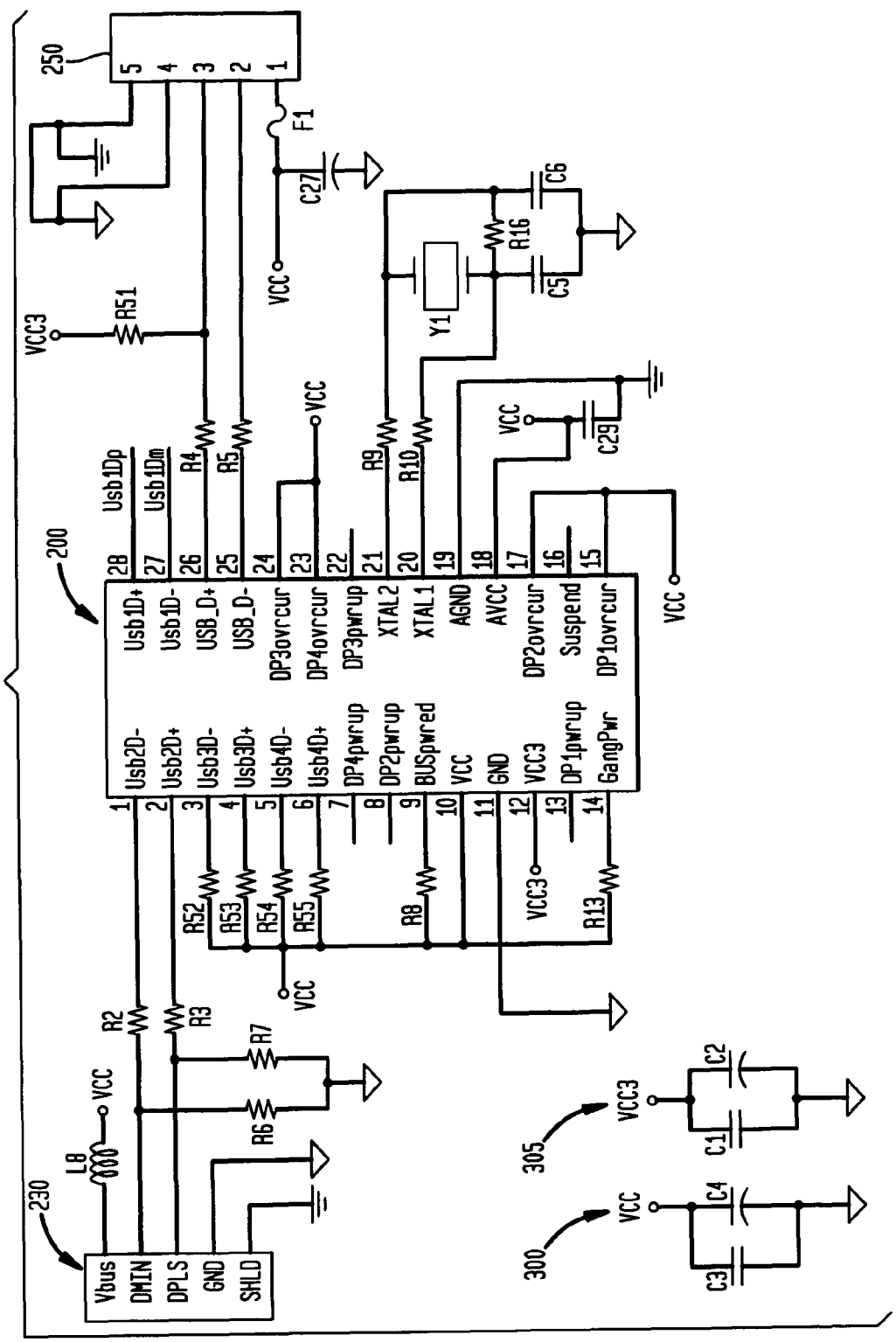
FIG. 3 illustrates a schematic diagram of a receiver and hub controller according to the invention.

FIG. 3 illustrates a schematic diagram of a receiver and hub controller according to the invention. The receiver 230 may receive wireless RF signals from a handle held transmitter in a known manner and convert these signals into instructions for controlling the presentation software running at the host computer using any known techniques. For example, any type of keyboard instruction, such as page up and page down instructions, may be provided. The host computer responds to the instruction as if the corresponding keystroke or mouse equivalent was made using an attached keyboard or mouse. The receiver 230 essentially mimics the functionality of a keyboard. When a key is pressed on a keyboard, a corresponding scan code is sent to the host computer's keyboard BIOS, where the code are converted to ASCII seven-bit code, e.g., using a look up table, for use by the host computer. One example is the well-known IBM keyboard scan codes. For example, the two-character sequence for page up (PgUp) is the decimal pair (00,73) or hex pair (0x00,0x49), and for page down (PgDn), the decimal pair is (00,81) and the hex pair is (0x00,0x51). The receiver 230 may provide other instructions to the host computer, e.g., for going to the start or finish of a presentation, or pausing a multimedia presentation. Further details regarding the receiver 230 are provided in FIGS. 5 and 6 and the related discussion. The externally-accessible port 250 is schematically illustrated as having four lines and a ground, e.g., according to the USB standard.

The hub controller 200 may use the Alcor Micro Corp. model Au9254A21. This type of hub controller is an integrated single chip USB hub controller which supports four downstream ports, each of which has power switch control and over-current sensing. The pins for the downstream ports can be connected to the receiver 230 and memory 240 without external glue logic. The specified hub controller has a built-in 3.3V voltage regulator that allows a single +5V operating voltage, runs at 12 MHz, and is available in a 28-pin small shrink outline plastic package (SSOP). Advantageously, an off-the-shelf hub controller can be used in the peripheral of the present invention. Moreover, since the hub controller, receiver and memory are internal to the peripheral housing, there is no need for conventional port connectors, such as sockets and cable plugs, within the housing. Instead, direct connections are made between the pin outputs which are assigned within the logic of the hub controller to downstream ports, but not actually connected to conventional ports, and the receiver and the memory. The hub controller 200 is a type of micro controller. Generally, any type of micro controller that enables the receiver 230 and memory 240 to communicate with the port 250 may be used. For example, a micro controller can be designed with software that sees the USB signal at the port 250 and routes it to the receiver 230 or memory 240.

Circuits 300 and 305 use bypass capacitors to filter noises at Vcc and Vcc3, respectively.

The components in FIG. 3 may be specified as follows, where L is an inductor, R is a resistor, C is a capacitor, F is a fuse, and Y is a crystal oscillator: C1-0.1 pF; C2-1 pF; C27-120 µF; C29-0.1 pF; C3-0.1 pF; C4-10 pF; C5-15 pF; C6-15 pF; F1-3A; L8-an inductor having a global part number of BLM21 (chip ferrite beads, monolithic type, length×width=2.0 mm×1.25 mm; R2-39Ω; R3-39Ω; R4-39Ω; R5-39Ω; R6-15 kΩ; R7-15 kΩ; R8-1 kΩ; R9-33Ω; R10-33Ω; R13-10 kΩ; R16-1 MΩ; R51-1.5 kΩ; R52-10 kΩ; R53-10 kΩ; R54-10 kΩ; R55-10 kΩ; Y1-12 MHz.

The resistors are rated 5%, ⅛W, and the capacitors are rated 10%, 50V.

The pin assignments of the example hub controller 200 are set forth in Table 1. I/O denotes Input/Output.

TABLE 1

| Pin No. | Pin Name | I/O | Description |
| --- | --- | --- | --- |
| 1 | USB_DM | I/O | USB D– for downstream port 2; add 15 KΩ pull-down to ground. |
| 2 | USB2_DP | I/O | USB D+ for downstream port 2; add 15 KΩ pull-down to ground. |
| 3 | USB3_DM | I/O | USB D– for downstream port 3; add 15 KΩ pull-down to ground. |
| 4 | USB3_DP | I/O | USB D+ for downstream port 3; add 15 KΩ pull-down to ground. |
| 5 | USB4_DM | I/O | USB D– for downstream port 4; add 15 KΩ pull-down to ground. |
| 6 | USB4_DP | I/O | USB D+ for downstream port 4; add 15 KΩ pull-down to ground. |
| 7 | DP4_PWRUP | O | Downstream port 4 power switch control. Active low. |

TABLE 1-continued

| Pin No. | Pin Name | I/O | Description |
|---|---|---|---|
| 8 | DP2_PWRUP | O | Downstream port 2 power switch control. Active low. |
| 9 | BUS_PWRED | I | Bus power. Low indicates bus-powered. |
| 10 | VCC5O/VCC5IK | Power | +5 V power supply. |
| 11 | GND5O/GND5IK | Power | Ground. |
| 12 | VCC3V | Power | 3.3 V output for upstream D+ pull-up. |
| 13 | DP1_PWRUP | O | Downstream port 1 power switch control. Active low. |
| 14 | GANGPOWER | I | Ganged or individual port power selection. Add a 10k pull down for ganged power. 10k pull up for individual power. |
| 15 | DP1_OVRCUR | I | Downstream port 1 over-current indicator. Active low. |
| 16 | SUSPEND | O | Device is in suspended state: Active high. |
| 17 | DP2_OVRCUR | I | Downstream port 2 over-current indicator. Active low. |
| 18 | NC | | |
| 19 | AGND/GNDO | Power | +5 V power supply. |
| 20 | XTAL_1 | I | Crystal in. |
| 21 | XTAL_2 | O | Crystal out. |
| 22 | DP3_PWRUP | O | Downstream port 3 power switch control. Active low. |
| 23 | DP4_OVRCUR | I | Downstream port 4 over-current indicator. Active low. |
| 24 | DP3_OVRCUR | I | Downstream port 3 over-current indicator. Active low. |
| 25 | USB_DM | I/O | USB D− for upstream. |
| 26 | USB_DP | I/O | USB D+ for upstream port. Need external 1.5 KΩ pull-up to 3.3 V. |
| 27 | USB1_DM | I/O | USB D− for downstream port 1; add 15 KΩ pull-down to ground. |
| 28 | USB1_DP | I/O | USB D+ for downstream port 1; add 15 KΩ pull-down to ground. |

Figure 4:
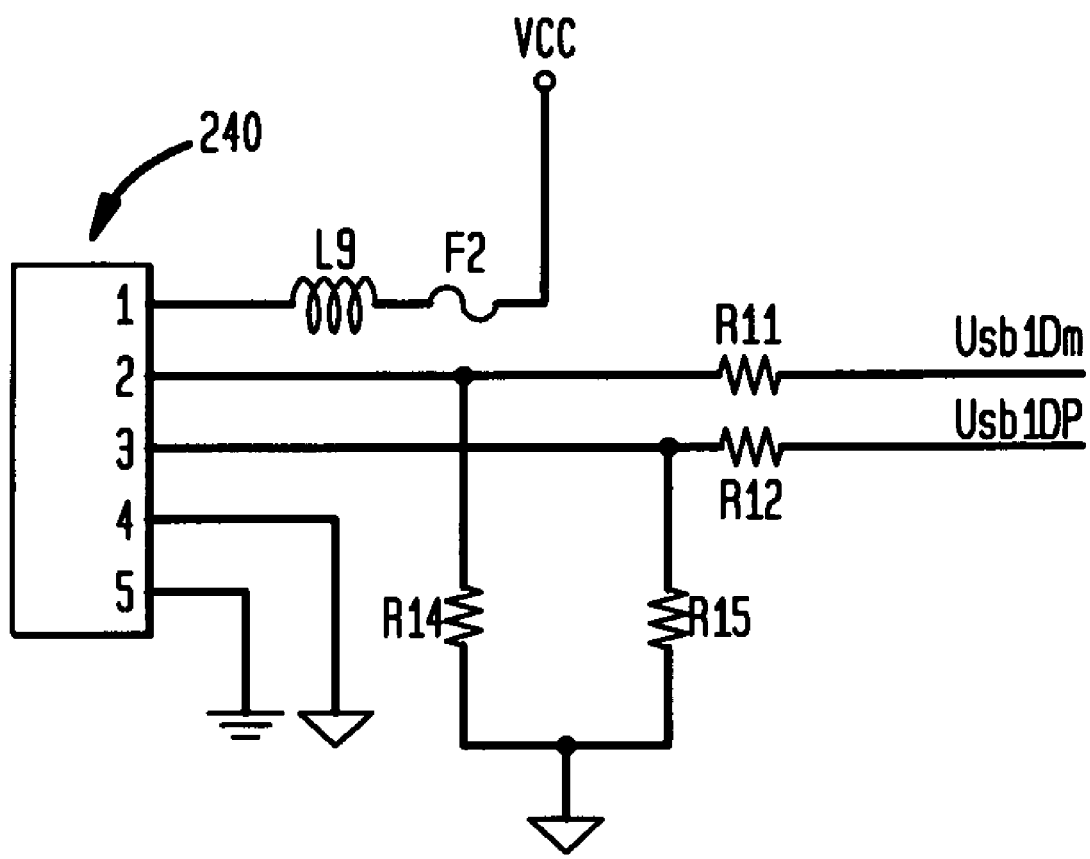
FIG. 4 illustrates a schematic diagram of a memory according to the invention.

FIG. 4 illustrates a schematic diagram of a memory according to the invention. The memory 240 may be any of various types of storage media. In one approach, a USB hard drive is used. Other options include the Samsung flash RAM, SmartMedia Card, CompactFlash Card, Sony Memory Stick, and PCMCIA card. Such memories are available with different capacities, such as 32, 64 and 128 Mb. The capacity may be selected according to the amount of presentation data that is expected to be stored.

The components in FIG. 4 may be specified as follows: F2-3A; L9-27Ω; R11-39Ω; R12-39Ω; R14-15 kΩ; R15-15 kΩ.

Figure 5:
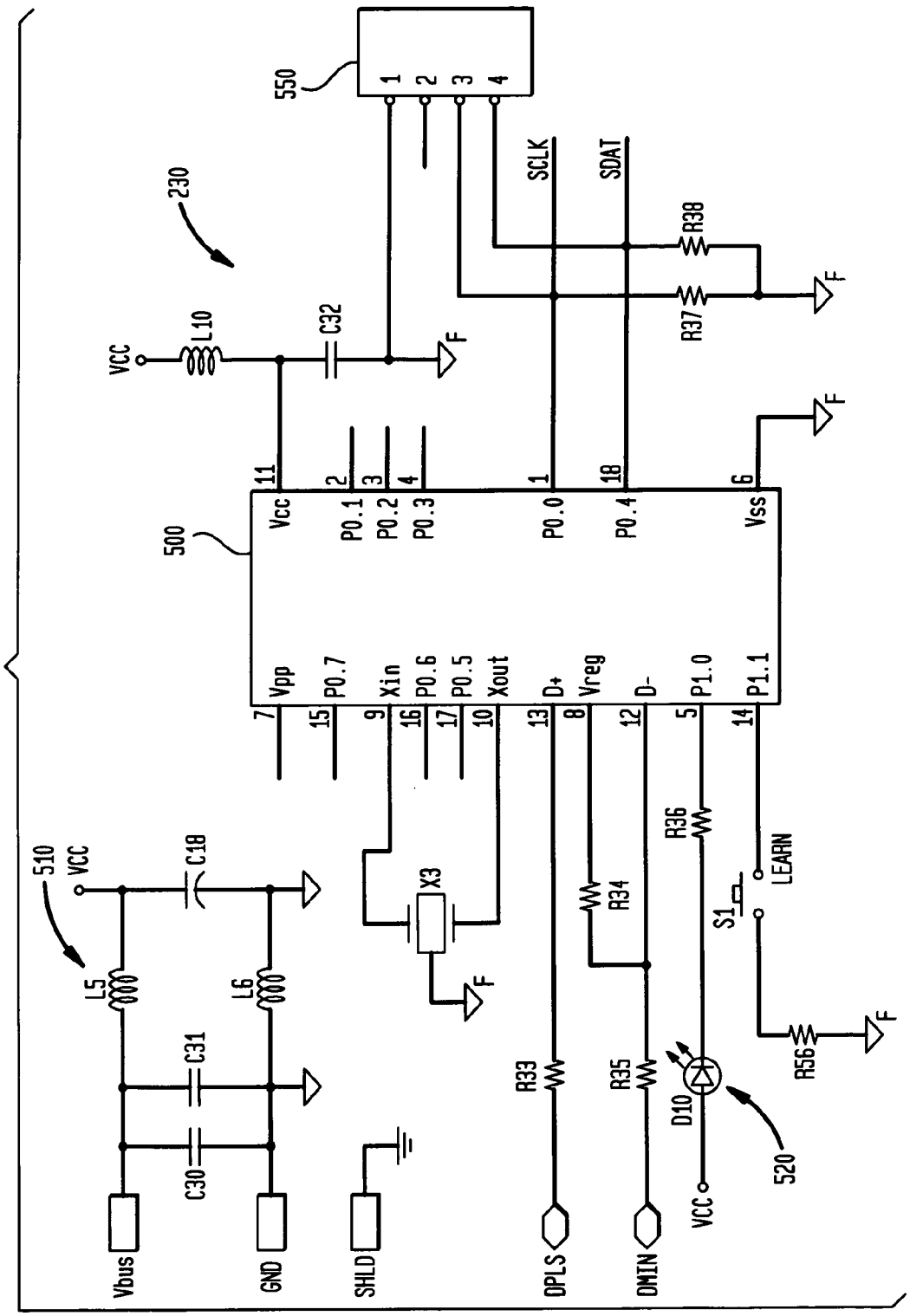
FIG. 5 illustrates a schematic diagram of a receiver controller according to the invention.

FIG. 5 illustrates a schematic diagram of a receiver controller according to the invention. The receiver 230 includes a controller 500. An example controller is the Cypress Semiconductor Corporation model CY7C63723. Such a device is a combination low-speed USB and PS/2 peripheral controller. As mentioned, it is possible to provide an external PS/2 port or other type of port on the housing 700 (FIG. 7) in addition to the USB port 250. In the example embodiment, only the USB functions are used. Optionally, a receiver controller that supports only USB or other standard could be used, for example. The controller 500 includes an integrated USB transceiver for communicating with the hub controller 200. The functionality of a light-emitting diode (LED) 520 and push button 745 on the housing 700 are discussed in connection with FIG. 7. In one approach, the hub controller 200 and receiver circuitry 230 are provided on a motherboard circuit, while the memory 240 is provided on a daughter board that is soldered to the motherboard. A programming pad 550 may be used to allow the controller 500 to be programmed with an identification number at the time of manufacture.

A circuit 510 is an LC circuit used to filter EMI sources from the host PC 100. The receiver 230 may include two distinct circuits: an RF receiver circuit and a USB interface circuit. The RF receiver circuit picks up an RF signal from an antenna, and converts it into digital signals. The operation of the USB interface circuit is performed by firmware code embedded inside the controller 500. First, the controller 500 identifies whether the host PC port is a PS/2 or USB port, for instance, then it interprets the digital signal commands from the receiver to a PS/2 or USB format scan code.

The components in FIG. 5 may be specified as follows: C18-100 μF at 16V; C30-0.01 pF; C31-0.1 pF; C32-0.1 pF; L10-BLM601; L5-1.8 μH; L6-1.8 μH; R33-24Ω; R34-1.3 kΩ; R35-24Ω; R36-1 kΩ; R37-10 kΩ; R38-1MΩ; R56-10Ω; X3-6 MHz.

The pin assignments of the example receiver controller 500 are set forth in Table 2.

TABLE 2

| Pin No. | Pin Name | I/O | Description |
|---|---|---|---|
| 12, 13 | D−/SDATA, D+/SCLK | I/O | USB differential data lines (D− and D+), or PS/2 clock and data signals (SDATA and SCLK) |
| 1, 2, 3, 4, 15, 16, 17, 18 | P0[7:0] | I/O | GPIO Port 0 capable of sinking up to 50 mA/pin, or sinking controlled low or high programmable current. Can also source 2 mA current, provide a resistive pull-up, or serve as a high-impedance input. P0.0 and P0.1 provide inputs to Capture Timers A and B, respectively. |
| 5, 14 | P1[7:0] | I/O | IO Port 1 capable of sinking up to 50 mA/pin, or sinking controlled low or high programmable current. Can also source 2 mA current, provide a resistive pull-up, or serve as a high-impedance input. |
| 9 | XTALIN/P2.1 | I | 6-MHz ceramic resonator or external clock input, or P2.1 input |
| 10 | XTALOUT | O | 6-MHz ceramic resonator return pin or internal oscillator output |
| 7 | $V_{PP}$ | | Programming voltage supply, ground for normal operation |
| 11 | $V_{CC}$ | | Voltage supply |
| 8 | $V_{REG}$/P2.0 | | Voltage supply for 1.3-k §U USB pull-up resistor (3.3 V nominal). Also serves as P2.0 input. |
| 6 | $V_{SS}$ | | Ground |

Figure 6:
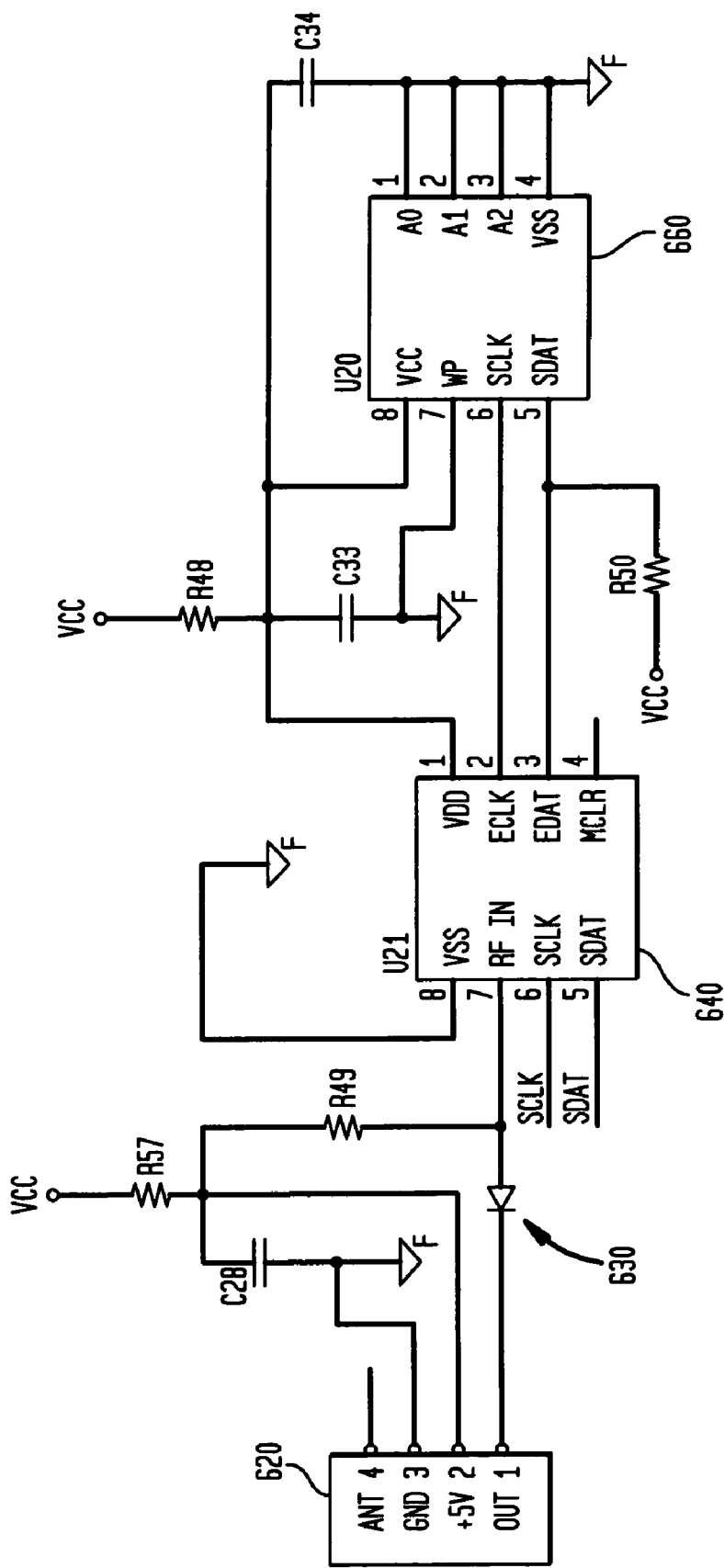
FIG. 6 illustrates a schematic diagram of a receiver decoder according to the invention.

FIG. 6 illustrates a schematic diagram of a receiver decoder according to the invention. The decoder 640 may be the Microchip HCS500, which is a code hopping decoder with a learning mechanism. The manufacturer's code, encoded keys and synchronization information are store in encrypted form in an external EEPROM 660, such as the Integrated Silicon Solutions, Inc. model IS24C02. A switching diode 630 may be the Rohm DAN202K.

The components in FIG. 6 may be specified as follows: C28-0.1 pF; C33-0.1 pF; C34-0.1 pF; R48-10 kΩ; R49-1 MΩ; R50-1 kΩ; R57-10 kΩ.

The pin assignments of the example decoder 640 are set forth in Table 3. P denotes power in. ST denotes a Schmitt Trigger input.

TABLE 3

| Pin No. | Pin Name | I/O | Buffer Type | Description |
|---|---|---|---|---|
| 1 | $V_{DD}$ | P | | Power connection |
| 2 | EE_CLK | O | TTL | Clock to I²C EEPROM |
| 3 | EE_DAT | I/O | TTL | Data to I²C EEPROM |
| 4 | MCLR | I | ST | Master clear input |

TABLE 3-continued

| Pin No. | Pin Name | I/O | Buffer Type | Description |
|---|---|---|---|---|
| 5 | S_DAT | I/O | TTL | Synchronous data from controller |
| 6 | S_CLK | I | TTL | Synchronous clock from controller |
| 7 | RFIN | I | TTL | RF input from receiver |
| 8 | GND | P | | Ground connection |

The pin assignments of the example EEPROM 660 are set forth in Table 4.

TABLE 4

| Pin No. | Pin Name | I/O | Description |
|---|---|---|---|
| 1 | A0 | I | Address input |
| 2 | A1 | I | Address input |
| 3 | A2 | I | Address input |
| 4 | GND | | Ground |
| 5 | $V_{CC}$ | | Power supply |
| 6 | WP | I | Write protect input |
| 7 | SCL | I | Serial clock input |
| 8 | SDA | I/O | Serial address data I/O |

Figure 7:
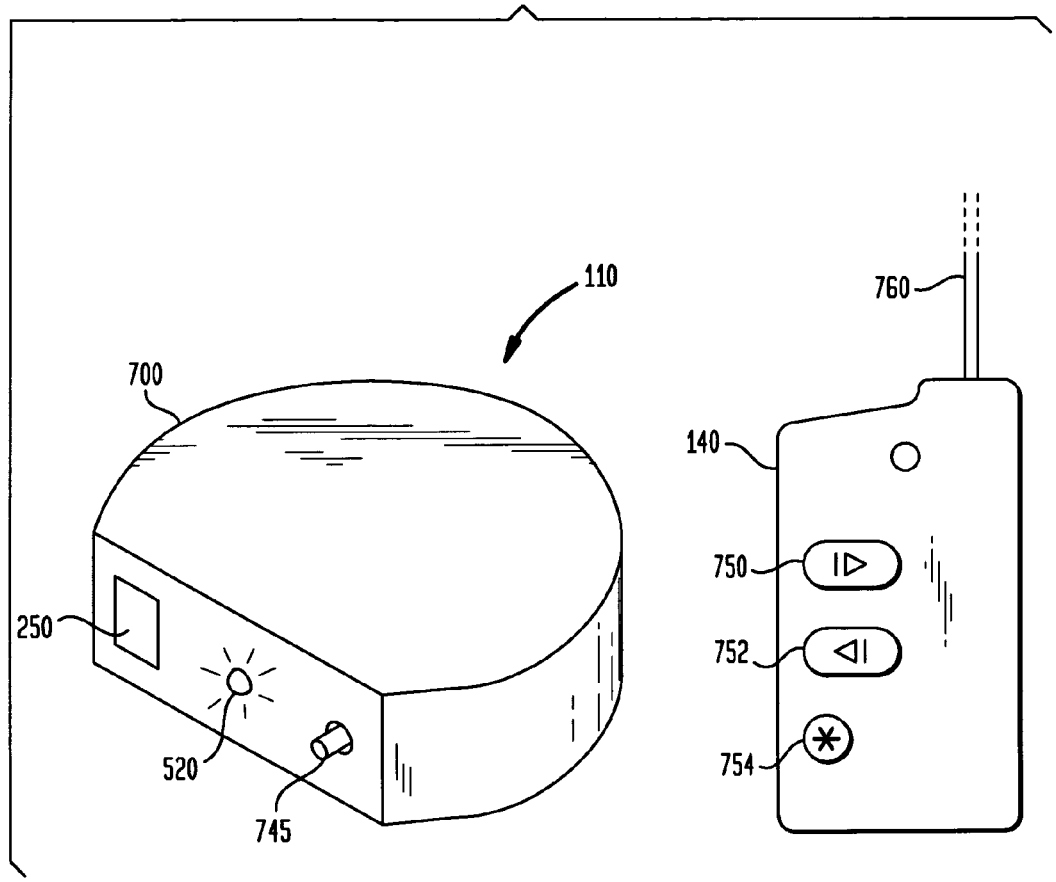
FIG. 7 illustrates a housing for a combined receiver and memory peripheral according to the invention, and a handheld transmitter therefor.

FIG. 7 illustrates a housing for a combined receiver and memory peripheral according to the invention, and a hand held transmitter therefor. In a working design demonstrating the portability of the peripheral 110, the peripheral was constructed in a housing 700 weighing two ounces and having L×W×H dimensions of 66 mm×86 mm×31 mm. As mentioned, the presentation data can be stored in the peripheral 110 using a first host computer, and the peripheral can be carried to the presentation location where an available, second host computer accesses the peripheral to run a presentation. After connecting the peripheral to the second host computer, the presentation software on the host computer is started, e.g., in a slide show mode. A first button 750 on the transmitter 140 is pressed to advance to the next slide, and a second button 752 is pressed to go back to the previous slide. These buttons 750 and 752 mimic the page down and page up keys on a keyboard. A third button 754 is pressed to activate a laser beam 760 of a laser pointer that is provided within the transmitter 140.

A learn feature of the peripheral 110 allows the transmitter 140 to be trained to the receiver in the peripheral 140. Generally, a transmitter will be trained to the receiver at the time of manufacture and the two will be sold in a package. However, the user may train a new transmitter, or re-train an existing transmitter, into the receiver of the peripheral by pressing and releasing the program button 745 at the rear of the housing 700, which causes the LED 520 to light steadily. The advance button 750 on the transmitter 140 is pressed three times and, on the third press, the LED 520 turns off, indicating the transmitter 140 has been trained. To delete all of the transmitters that have been trained to a receiver, the program button 745 is pressed and held. The LED lights for three seconds, then goes out, and the program button is released.

The invention has been described herein with reference to particular exemplary embodiments. Certain alterations and modifications may be apparent to those skilled in the art, without departing from the scope of the invention. The exemplary embodiments are meant to be illustrative, not limiting of the scope of the invention, which is defined by the appended claims.

What is claimed is:

1. A computer peripheral, comprising:
    a housing including an externally-accessible port for directly communicating with a host computer;
    a receiver within the housing for receiving a wireless signal from a transmitter and converting the wireless signal into an instruction for the host computer, said receiver mimics the functionality of a keyboard of the host computer;
    a memory within the housing that stores image data displayed via the host computer; and
    a hub controller within the housing for connecting the receiver and the memory to the externally-accessible port, the host computer receiving the image data and keyboard instruction through the hub controller and externally-accessible port and wherein the keyboard instruction from the receiver controls the display by the host computer of the image data and wherein specified pins of the hub controller that are assigned within the hub controller to downstream ports are coupled to the receiver and the memory; and specified pins of the hub controller that are assigned within the hub controller to an upstream port are coupled to the externally-accessible port.

2. The computer peripheral of claim 1, wherein: the externally-accessible port comprises a Universal Serial Bus (USB) port.

3. The computer peripheral of claim 1, wherein: the wireless signal comprises a radio-frequency signal.

4. The computer peripheral of claim 1, wherein: the instruction comprises at least one of a page up and page down instruction.

5. The computer peripheral of claim 1, wherein: the instruction comprises an instruction for controlling presentation software running at the host computer.

6. The computer peripheral of claim 1, wherein: the instruction comprises at least one keyboard scan code.

7. The computer peripheral of claim 1, wherein: the data comprises presentation data.

8. The computer peripheral of claim 1, wherein: the memory comprises a Universal Serial Bus (USB) storage media.

9. The computer peripheral of claim 1, wherein: the micro controller comprises a hub controller.

10. The computer peripheral of claim 9, wherein: specified pins of the hub controller are coupled to the receiver and the memory, and to the externally-accessible port.

11. The computer peripheral of claim 10, wherein: the pins coupled to the receiver and the memory are assigned within the hub controller to downstream ports, and the pins coupled to the externally-accessible port are assigned within the hub controller to an upstream port.

12. A computer peripheral, comprising:
    housing including an externally-accessible port for directly communicating with a host computer;
    a receiver within the housing for receiving a wireless signal from a transmitter and converting the wireless signal into a keyboard instruction for the host computer for controlling presentation software running at the host computer, said receiver mimics the functionality of a keyboard of the host computer;
    a memory within the housing that stores image data displayed by the presentation software running at the host computer; and
    a hub controller within the housing for connecting the receiver to the externally-accessible port that provides the keyboard instruction to the host computer, and that connects the memory to the externally-accessible port to upload the image data to the host computer and wherein the keyboard instruction controls display of the image data by the presentation software and wherein specified pins of the hub controller that are assigned within the hub controller to downstream ports are coupled to the receiver and the memory; and specified pins of the hub controller that are assigned within the hub controller to an upstream port are coupled to the externally-accessible port.

13. The computer peripheral of claim 12, wherein: the micro controller comprises a hub controller; specified pins of the hub controller that are assigned within the hub controller to downstream ports are coupled to the receiver and the memory; and specified pins of the hub controller that are assigned within the hub controller to an upstream port are coupled to the externally-accessible port.

14. A computer peripheral, comprising:
a housing including an externally-accessible port for directly communicating with a host computer;
a receiver within the housing that receives a wireless signal from a transmitter and converts the received wireless signal into a keyboard instruction that controls presentation software running at the host computer, said receiver mimics the functionality of a keyboard of the host computer;
a memory within the housing for storing image data displayed by the presentation software running at the host computer; and
a hub controller within the housing for connecting the receiver to the externally-accessible port, and for connecting the memory to the externally-accessible port; wherein: specified pins of the hub controller that are assigned within the hub controller to downstream ports are coupled to the receiver and the memory; and specified pins of the hub controller that are assigned within the hub controller to an upstream port are coupled to the externally-accessible port, wherein the host computer uploads the image data from the memory and the receiver provides the keyboard instruction to the host computer through the hub controller and externally-accessible port and wherein the keyboard instruction controls presentation of the image data by the presentation software.

* * * * *